May 1, 1945.  H. ARTER  2,375,172

WORK SUPPORT ADJUSTING MECHANISM FOR MACHINE TOOLS

Filed Sept. 3, 1940  2 Sheets-Sheet 1

Inventor
Harry Arter
by
Attorney.

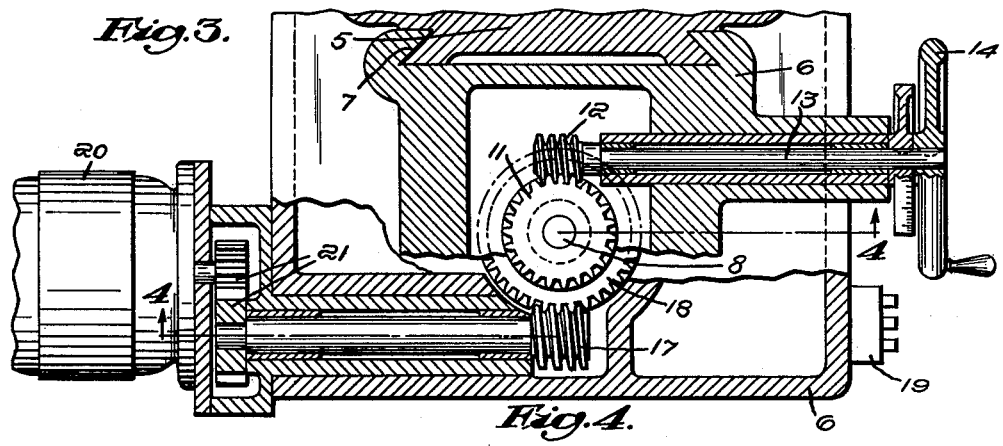
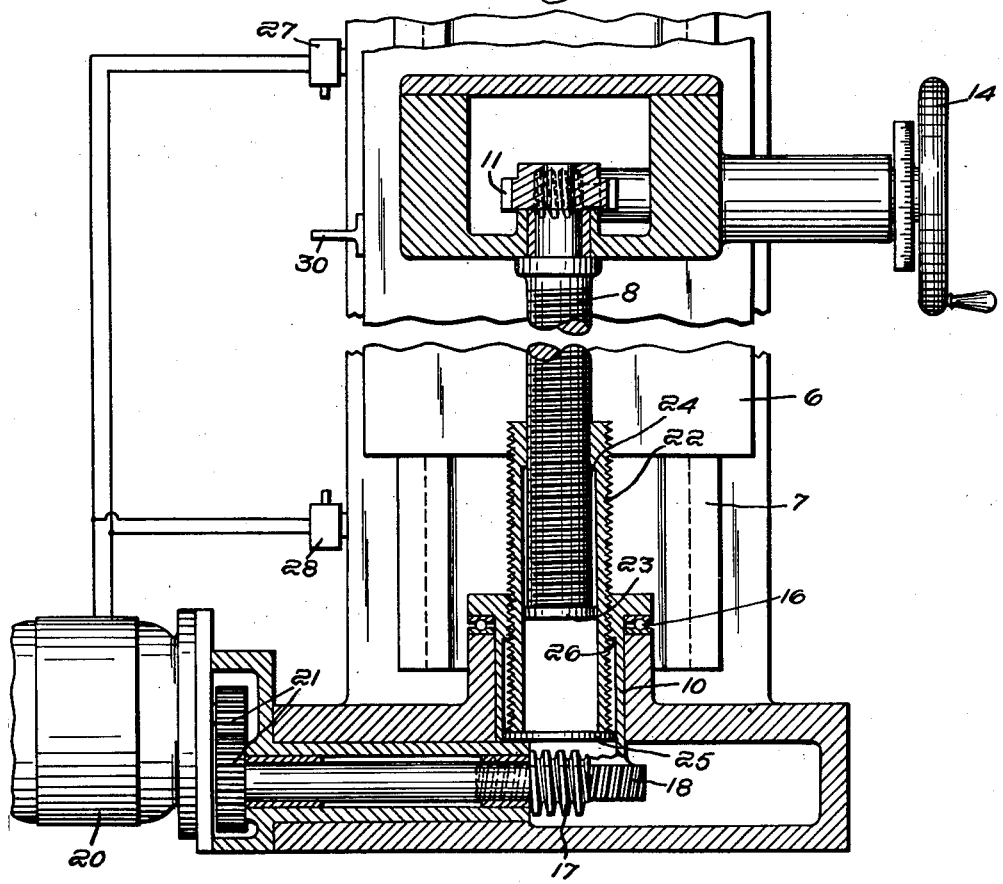

Patented May 1, 1945

2,375,172

UNITED STATES PATENT OFFICE 2,375,172

WORK SUPPORT ADJUSTING MECHANISM FOR MACHINE TOOLS

Harry Arter, Worcester, Mass., assignor to Arter Grinding Machine Company, Worcester, Mass., a corporation of Massachusetts Application September 3, 1940, Serial No. 355,162

8 Claims. (Cl. 51—216)

This invention relates to work supports for various machine tools and is more especially concerned with the means for adjusting these supports to meet the requirements of the various conditions under which they are used. The invention will be herein disclosed as embodied in a rotary surface grinder of a common commercial form.

In machines of this general character some provision is made for adjusting the work support up and down. A common arrangement provided for this purpose consists of a lifting screw connected by some form of gear mechanism to a hand wheel so that by revolving this wheel the work support may be moved vertically. If the machine is designed for heavy work, or if the work support itself is heavy, it is a common practice also to provide a power driven mechanism which can be thrown into and out of operation, as desired, to raise or lower the support. Because it is always desirable to be able to make some of these adjustments of the work support manually, even though power driven mechanism also is provided for this purpose, it is common to use both the manual and power driven types of drives with the same work support. However, it has been necessary heretofore in such an organization to employ some means, such as clutches, to connect these mechanisms selectively with the work support elevating device so that either could be used, when desired.

The present invention aims to improve work support adjusting mechanisms of this general character with a view to simplifying their construction and eliminating the necessity for the use of clutches or equivalent devices.

The nature of the invention will be readily understood from the following description when read in connection with the accompanying drawings, and the novel features will be particularly pointed out in the appended claims.

In the drawings,

Fig. 3 is a horizontal, sectional view of a modified embodiment of the invention; and Fig. 4 is a vertical, sectional view approximately on the line 4—4, Fig. 3.

Figure 1:
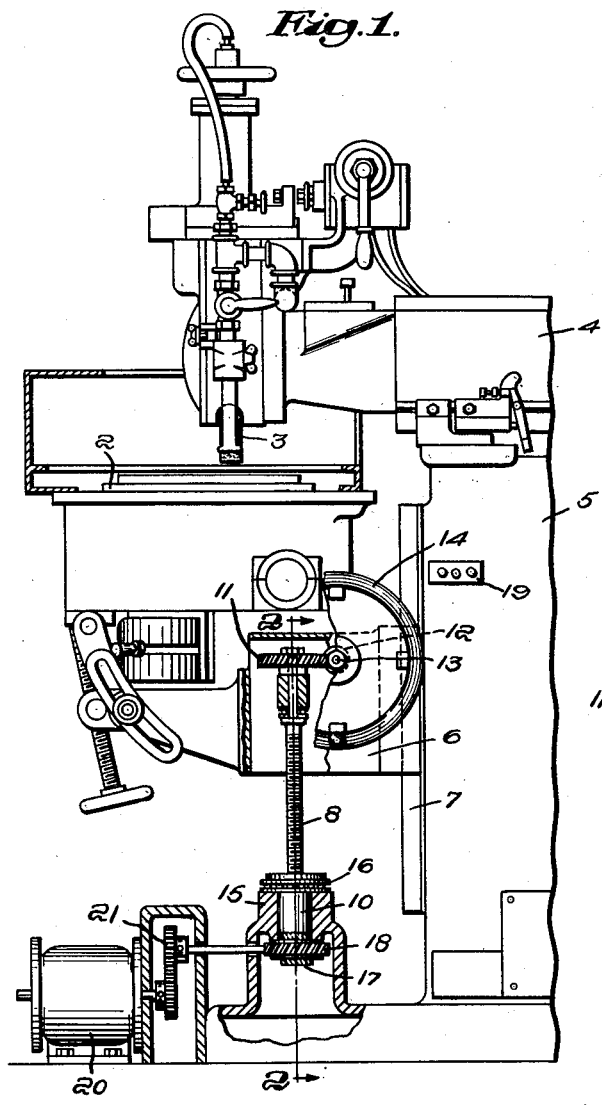
Figure 1 is a side view, with some parts broken away and others in section, showing a portion of a rotary surface grinder equipped with a work support adjusting mechanism constructed in accordance with this invention.

Referring first to Fig. 1, the machine there partially illustrated is like that shown and described in the Fraser Patent No. 2,018,847, granted October 29, 1935, and reference may be had to that patent for a more complete disclosure of the machine.

Those parts shown in Fig. 1 include a chuck 2 mounted to revolve around a vertical axis and adapted to support articles of work for the operation thereon of the grinding wheel 3. This wheel is mounted on a wheel head 4 which is supported on the frame 5 for horizontal reciprocating movement to carry the wheel backward and forward across the face of the chuck. The chuck structure is supported by a bracket 6 which is mounted on a vertical dove-tail guide 7 that is secured to, or forms a part of, the machine frame 5.

The adjusting mechanism for the work supporting member 6 comprises a vertical screw 8 threaded into a nut 10 and carrying a thrust bearing at its upper end on which the bracket 6 is supported. Above the bracket a worm gear 11 is keyed to an extension of the screw 8 and meshes with a worm 12 fast with the shaft 13. A hand wheel 14 is secured to the outer end of this shaft.

With the exception of the fact that the nut 10 is mounted to revolve, all of the construction above described is in common use. According to the present invention, however, the nut 10, instead of being stationary, as in the prior art constructions, is mounted in a bearing 15 to revolve about the axis of the screw 8, and this nut and the load which it carries are supported on an antifriction thrust bearing 16. Also, a power driven worm and gear mechanism is provided to revolve this nut. As shown, a worm gear 17 is keyed to the lower end of the nut and meshes with a worm 18 which is connected with an electric motor 20, preferably through a speed reducing gearing 21. The motor is of the reversible type and is controlled in any convenient manner as, for example, from a switch 19 equipped with start, stop. and reversing buttons.

It will be evident from the foregoing that the lifting screw and nut 8 and 10 are arranged to be driven, respectively, by two irreversible mechanisms. Consequently, either can be used independently of the other, and during such use one mechanism serves to hold its respective member against rotation, while the other mechanism revolves its member of the screw and nut combination.

Thus both operating mechanisms remain continuously connected with the nut and screw assembly, each is instantly operable, independently of the other, and without any preliminary adjustments or operation of clutches. In addition, the combination of the manually operable and power driven mechanisms for the adjusting apparatus is extraordinarily simple.

If the desired range of adjustment of the work support is greater than can be conveniently accommodated by a single screw threaded shaft like that shown at 8, then the screw can be made of the telescoping type, any suitable number of sections necessary for the particular adjustment being used.

Figure 2:
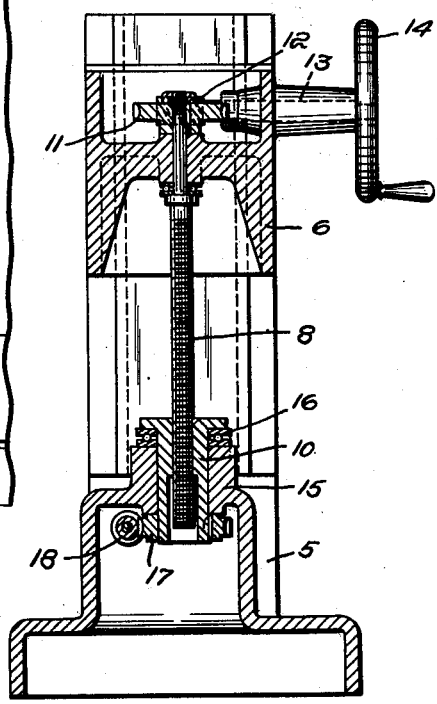
Fig. 2 is a vertical, sectional view approximately on the line 2—2, Fig. 1.

Such an arrangement is illustrated in Figs. 3 and 4 in which the parts corresponding to those shown in Figs. 1 and 2 are designated by the same numerals. Here the lifting screw includes both the male section 8 and also a female section 22 into which the other section is threaded. The latter has an enlargement 23 at its lower end to engage the smooth section of the bore of the part 22, both for guiding purposse and also to cooperate with the internal shoulder 24 of the part 22 to limit the relative extension movement of the two sections. The outer section 22 is threaded into the nut 10 and has an enlargement or collar 25 on its lower end to engage a shoulder 26 in the nut and thus limit the upward movement of the section 22.

The operation of this mechanism, including the telescoping screw, is like that of the construction previously described.

In addition to limiting the relative extending movements of the telescoping sections by means of the collars 23 and 25 and the shoulders 24 and 26, it may also be desirable to make use of some arrangement for controlling or limiting the range of adjustment of the work support by the motor 20. This can be conveniently done by mounting limit switches, such as those shown at 27 and 28, Fig. 4, where one or the other will be engaged by an arm 30 whenever the work support arrives at either the desired upper or lower limit of its movement. The engagement of the part 30 with the push button of either of the switches 27 or 28 opens the motor circuit and shuts it down. It may be started up in the opposite direction, however, after having been so stopped, by pushing the starting button of the switch 19, Fig. 3. Electrical controls of this character have been used in other forms of electrical apparatus to limit the movement of a traversing carriage or other slidable member, and they are so arranged as to prevent starting up the motor in the same direction in which it has been running when the member operated by it has reached the limit of its movement in either direction.

In many of these machine tools the tool is adjusted to the work instead of the work being adjusted to the tool, or provision is made in many of them for adjusting each with reference to the other, all of these arrangements being equivalents. So far as this invention is concerned it obviously is immaterial which member is adjusted.

While I have herein shown and described a typical embodiment of my invention, it will be evident that the invention may be embodied in other forms without departing from the spirit or scope thereof.

Having thus described my invention, what I desire to claim as new is:

1. In a machine tool, the combination with a work support, a tool for operating on the work, and means for guiding said support for adjusting movement relatively to said tool, of a screw operatively connected with said support for movement therewith but rotatable relatively to said support, a nut into which said screw is threaded, and two irreversible mechanisms connected with said screw and said nut, respectively, for revolving them independently of each other.

2. In a machine tool, the combination with a work support, a tool for operating on the work, means for guiding said support for adjusting movement relatively to said tool, of a screw operatively connected with said support for movement therewith but rotatable relatively to said support, a nut into which said screw is threaded, and two irreversible worm and gear mechanisms connected, respectively, with said nut and said screw, a manually operable device connected with one of said mechanisms to revolve the worm element thereof, and power operated means connected with the worm of the other of said mechanisms for revolving it.

3. In a machine tool, the combination with a work support, a tool for operating on the work, means for guiding said support for adjusting movement relatively to said tool of a screw operatively connected with said support to adjust it, a nut into which said screw is threaded, and two irreversible mechanisms connected with said screw and said nut, respectively, for revolving them independently of each other.

4. In a machine tool, the combination with a work supporting member and means for guiding said member for vertical adjusting movement, of an upright screw, a thrust bearing carried by said screw and supporting said member, a nut into which said screw is threaded, and two irreversible mechanisms connected with said screw and said nut, respectively, for revolving them independently of each other.

5. In a machine tool, the combination with a work supporting member and means for guiding said member for vertical adjusting movement, of an upright screw, a thrust bearing carried by said screw and supporting said member, a nut into which said screw is threaded, worm gears secured, respectively, to said nut and said screw for rotation therewith, two worms mounted in driving engagement with said respective worm gears, each of said worm and worm gear combinations constituting an irreversible drive, means operable to revolve said worms independently of each other, and a bearing for taking the thrust of said nut.

6. In a machine tool, the combination with a chuck for supporting the work, a slide supporting said chuck and means for guiding said slide for vertical adjusting movement, of an upright screw operatively connected with said slide to adjust it, a nut into which said screw is threaded, worm gears positioned one above the other and secured to said nut and screw, respectively, for rotation therewith, two worms in driving engagement with said respective worm gears, each of said worm and worm gear combinations constituting an irreversible drive, means operable to revolve said worms independently of each other, and a bearing for taking the thrust of said nut.

7. In a machine tool, the combination with a chuck for supporting the work, a slide supporting said chuck and means for guiding said slide for vertical adjusting movement, of an upright screw operatively connected with said slide to adjust it, a nut into which said screw is threaded, worm gears positioned one above the other and secured to said nut and screw, respectively, for rotation therewith, two worms in driving engagement with said respective worm gears, each of said worm and worm gear combinations constituting an irreversible drive, the upper of said worm gears being mounted on said slide for vertical movement in unison therewith, a hand wheel connected with the worm for operating said upper gear to revolve the worm, a motor connected with the lower of said worms to drive it, and a bearing supporting said nut against the thrust of said screw and the load which it carries.

8. In a machine tool, the combination with a chuck for supporting the work, a slide supporting said chuck and means for guiding said slide for vertical adjusting movement, of an upright screw supporting said slide for vertical adjustment and having a part extending through the slide, a nut into which the lower part of said screw is threaded, a worm gear secured to said nut for rotation therewith, another worm gear connected to the portion of said screw above said slide for rotation in unison therewith, two worms mounted in driving engagement, respectively, with said worm gears, each of said worm and worm gear combinations constituting an irreversible drive, means operable to drive said worms independently of each other, and a bearing supporting said nut against the thrust of said screw and the load which the screw carries.

HARRY ARTER.